United States Patent [19]

Fauteux

[11] Patent Number: 5,219,680
[45] Date of Patent: Jun. 15, 1993

[54] LITHIUM ROCKING-CHAIR RECHARGEABLE BATTERY AND ELECTRODE THEREFOR

[75] Inventor: Denis Fauteux, Acton, Mass.

[73] Assignee: Ultracell Incorporated, San Jose, Calif.

[21] Appl. No.: 736,295

[22] Filed: Jul. 29, 1991

[51] Int. Cl.$^5$ .................... H01M 10/40; H01M 6/18
[52] U.S. Cl. ..................................... 429/192; 429/218
[58] Field of Search ............... 429/218, 212, 191, 194, 429/192, 213; 252/62.6

[56] References Cited

U.S. PATENT DOCUMENTS

| | | |
|---|---|---|
| 3,734,876 | 5/1973 | Chu . |
| 4,041,220 | 8/1977 | Armand .......................... 429/191 |
| 4,194,062 | 3/1980 | Carides et al. . |
| 4,303,748 | 12/1981 | Armand et al. . |
| 4,304,825 | 12/1981 | Basu . |
| 4,357,401 | 11/1982 | Andre et al. . |
| 4,423,125 | 12/1983 | Basu . |
| 4,584,252 | 4/1986 | Touzain et al. . |
| 4,631,810 | 12/1986 | Hooper et al. . |
| 4,654,279 | 3/1987 | Bauer et al. . |
| 4,814,242 | 3/1989 | Maxfield et al. ..................... 429/217 |
| 4,822,701 | 4/1989 | Ballard et al. . |
| 4,830,939 | 5/1989 | Lee et al. . |
| 4,925,752 | 5/1990 | Fauteux et al. ..................... 429/191 |
| 4,959,281 | 9/1990 | Nishi et al. . |
| 4,990,413 | 2/1991 | Lee ..................................... 429/191 |
| 5,028,500 | 7/1991 | Fong et al. . |
| 5,053,297 | 10/1991 | Yamahira et al. ............... 429/218 X |
| 5,069,683 | 12/1991 | Fong et al. . |

OTHER PUBLICATIONS

Tarascon, et al., Li Metal-Free Rechargeable Batteries Based on $Li_{1+x}Mn_2O_4$ Cathode ($0 \leq x \leq$) and Carbon Anodes, J. Electrochem. Soc. 138 (10): 2864–2868 (1991).

Dahn, et al., Rechargeable $LiNiO_2$/Carbon Nonaqueous Cells, Abstract No. 42, Primary and Second Lithium Battery Symposium of the 178th Electrochemical Society Meeting, Oct. 14–19, 1990.

*Primary Examiner*—Anthony Skapars
*Attorney, Agent, or Firm*—Richard L. Neeley

[57] ABSTRACT

A carbon/polymer composite electrode comprising substantially amorphous carbon entrapped in a polymeric matrix, wherein the matrix further entraps an interpenetrating ionically conducting liquid having an alkali metal salt dissolved therein.

22 Claims, No Drawings

LITHIUM ROCKING-CHAIR RECHARGEABLE BATTERY AND ELECTRODE THEREFOR

INTRODUCTION

1. Technical Field

This invention is directed to electrochemical cells and particularly to electrodes used as the negative electrode in a rechargeable lithium rocking chair battery.

2. Background

Solid-state electrochemical cells are typically constructed from an alkali metal negative electrode (anode), an ionically conducting polymeric electrolyte containing an ionizable alkali metal salt, and a positive electrode (cathode). The cathode is usually formed by preparing a mixture of an active material, a metal salt, a polymeric electrolyte, and a conductive filler such as carbon black, and coating this mixture on a metal foil which functions as a current collector. Electrochemical cells formed in this fashion using lithium metal as the alkali metal anode have found wide use in numerous applications requiring portable battery power, since lithium batteries formed in this manner have a high energy density However, lithium metal is widely considered to be the major source of safety-related problems when lithium batteries are made rechargeable. Charging of such batteries converts lithium ions to metallic lithium, and the presence of metallic lithium in undesirable locations in the battery structure can result in explosion of the battery One process that has been proposed to overcome this disadvantage is the use of an intercalation compound based anode coupled with an intercalation compound based cathode In electrochemical cells employing such electrodes, the charging and discharging process can be accomplished without the formation of metallic lithium as described below.

On discharge of the cell described above, lithium which is intercalated in the anode is discharged from that electrode into the electrolyte as lithium ions. The corresponding action at the cathode involves the intercalation of lithium ions into the active cathode material. When the resulting discharged cell is subjected to charging conditions, the reverse processes occur at the two lithium ions are discharged from the cathode and are intercalated into the active material of the anode. This entire process does not involve the formation of metallic lithium at any stage. Batteries made from such electrodes are referred to as "rocking-chair" batteries, since the alkali metal ions transfer back and forth between the anode and cathode.

Intercalation electrodes and rocking-chair batteries are known. For example, U.S. Pat. No. 4,631,810 to Hooper et al. discloses a method for making an intercalation compound based cathode in which a dispersion of vanadium oxide, acetylene black and polyethylene oxide in acetonitrile is applied to a nickel foil current collector and the solvent removed. However, there is a need for alternative approaches to preparing lithium intercalation electrodes

SUMMARY OF THE INVENTION

Accordingly, it is an object of the present invention to provide an electrode for use as the negative electrode in a rechargeable battery based on intercalation of lithium ions It is a further object of the present invention to provide such an electrode that is capable of obtaining current densities as high as or higher than 100 $\mu A/cm^2$ and/or storage capacities as high as or higher than 1.4 $mAh/cm^2$.

These and other objects of the invention have been achieved by providing a carbon/polymer composite electrode useful as the negative electrode (anode) in a rechargeable lithium battery, comprising essentially amorphous carbon dispersed in a polymeric matrix containing an interpenetrating ionically conducting liquid having an alkali metal salt dissolved therein. In preferred embodiments of the invention, the polymer and interpenetrating ionically conducting liquid together represent a polymer-host network electrolyte, as described in U.S. Patent Nos. 4,925,752 and 8,990,413. The positive electrode (cathode) in the rechargeable battery is a lithium intercalation compound based electrode and is preferably lithium vanadium oxide or lithium cobalt oxide.

DETAILED DESCRIPTION OF THE INVENTION

The present invention provides an electrode that can sustain a current density as high as or higher than 100 $\mu A/cm^2$ and which has a storage capacity as high as or higher than 1.4 $mAh/cm^2$. One unusual feature of the present invention is the use of a substantially amorphous or highly disordered form of carbon. Conventional teachings in the battery art indicated that ordered and crystalline forms of graphite and other ordered and crystalline carbon forms were preferred so as to provide ordered structures into which metal ions could intercalate. In contrast, the carbon used in the electrode of the present invention is substantially amorphous or highly disordered carbon. For example, the amorphous carbon can be activated carbon, acetylene black, Shawinigan black or the like. Acetylene black or Shawinigan black is a preferred amorphous carbon used to make an electrode of the invention. By a "substantially amorphous carbon" as used herein is meant a carbon in which at least about 80% or more of the carbon is noncrystalline or is microcrystalline in which at least about 80% of the carbon microcrystals are in a random arrangement. Preferably, the non-crystalline or the microcrystalline random arrangement of the carbon is at least about 90% or more and especially preferred is carbon in which essentially about 100% of the carbon is non-crystalline or has a microcrystalline random arrangement. See Pauling, L. "College Chemistry" (1957) W. H. Freeman & Co., San Francisco or Moeller, T. "Inorganic Chemistry" (1958) J. Wiley & Son, London for a discussion on amorphous or microcrystalline carbon as compared to crystalline carbon, such as graphite and diamond. The carbon material in a preferred embodiment of the present invention has particle diameter less than about 5 $\mu m$, more preferably less than about 1 $\mu m$, and surface area greater than about 20 $m^2/g$, more preferably greater than 50 $m^2/g$.

The polymeric network, which is interpenetrated by the ionically conducting liquid and which serves as a matrix for holding the amorphous carbon to form a composite electrode, can be formed from a conductive polymer or can be a supportive matrix of a non-conductive polymer.

Examples of polymers which may be used to form conductive polymeric networks are described in U.S. Pat. No. 4,303,748. These polymers have repeating units containing at least one heteroatom such as an oxygen or nitrogen atom. They can be represented as polymers having the repeating unit

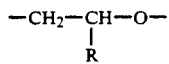

wherein R is hydrogen or a group $R_a$, $-CH_2OR_a$, $-CH_2OR_eR_a$, or $-CH_2N(CH_3)_2$ in which $R_a$ is an alkyl group containing 1 to 16 carbon atoms and preferably 1 to 4 carbon atoms or a cycloalkyl group containing 5 to 8 carbon atoms and $R_e$ is an ehter group of formula $-[CH_2-CH_2O]_p-$ wherein p is a number from 1 to 100, preferably 1 or 2: or having the repeating unit

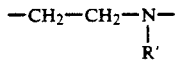

wherein $R'$ is $R_a$ or $R_eR_a$, as defined above; or having the repeating unit

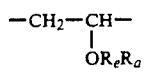

wherein $R_e$ and $R_a$ are defined above. Copolymers of the above polymers may also be useful.

In the electrodes of the present invention, these polymers are cross-linked to form a network which is sufficiently rigid to provide physical integrity to the composite electrode as the cell is charged, discharged, and recharged. These polymers may be cross-linked in a number of ways. For example, U.S. Pat. No. 4,357,401 to Andre et al. discloses PEO-PPO copolymers which are cross-linked by ethylene diamine. Where the polymer includes moieties of primary or secondary alcohols or amines, the polymer may be cross-linked by reaction with a cross-linking agent such as a polyisocyanate. For example, polyethylene oxides may also be cross-linked by using a cross-linking agent such as poly(ethylene glycol) diacrylate and a thermal free radical initiator such as 2,2'-azobis(2-methylpropionitrile) as described in U.S. application Ser. Nos. 115,492 filed Oct. 30, 1987 and 173,385, filed Mar. 25, 1988, now U.S. Pat. No. 4,830,939. See also U.S. Pat. No. 3,734,876. Radiation and thermally initiated free radical addition reactions may also be used to form the cross-linked polymeric network.

A particularly useful group of radiation polymerizable compounds for providing a cross-linked conductive matrix is obtained by reacting a low molecular weight polyethylene glycol with acrylic or methacrylic acid. Also useful in the present invention are radiation curable materials such as acrylated epoxies, e.g., Bisphenol A epoxy diacrylate, polyester acrylates, copolymers of glycidyl ethers and acrylates or a vinyl compound such as N-vinylpyrrolidone. The latter provides a non-conductive matrix.

Preferably, the aforementioned radiation polymerizable polyethylenically unsaturated compounds have a molecular weight of about 200 to 2,000 and more preferably 200 to 800. Still more preferably, they are liquids at temperatures less than 30° C. Examples of radiation curable materials include polyethylene glycol-300 diacrylate (average PEO molecular weight about 300), polyethylene glycol-480 diacrylate (average PEO molecular weight about 480) and the corresponding methacrylates.

It may be desirable to include a radiation curable comonomer in the composition to reduce the glass transition temperature and improve the conductivity of the polymer. Any suitable monoacrylate such as tetrahydrofurfuryl acrylate, tetrahydrofurfuryl methacrylate, methoxypolyethylene glycol mono-methacrylate, 2-ethoxyethyl acrylate, 2-methoxyethyl acrylate or cyclohexyl methacrylate may be used for this purpose. Triacrylates such as TMPTA, trimethylolpropane ethoxylated triacrylates (TMPEOTA) or trimethylolpropanepropoxy triacrylate may be used to introduce cross-linking of the polymer. Monoacrylates may be used in an amount of about 5 to 50% by weight based on the total amount of radiation polymerizable material The triacrylates are used in amounts of about 2 to 30% by weight on the same basis.

Examples of cross-linked non-conductive supportive polymers are described in U.S. Pat. No. 4,654,279 to Bauer et al. and include epoxies, polyurethanes, polymethacrylates, polyacrylates, polyacrylonitrile, and polystyrene.

The radiation inert liquids which form the ionically conductive liquid interpenetrating phase can be any low volatility aprotic polar solvent. Preferably, these materials are characterized by a boiling point greater than about 80° C. Low volatility simplifies manufacture and improves shelf life. Representative examples are propylene carbonate, gamma-butyrolactone, 1,3-dioxolane, and 2-methyltetrahydrofuran. Less polar solvents having heteroatoms capable of bonding alkali metal cations are also useful. Polyethylene glycol dimethyl ether (PEGDME) is one such example. Glymes such as tetraglyme, hexaglyme, and heptaglyme are also desirable solvents. Preferably, the liquid is propylene carbonate.

Ionizable alkali metal salts useful in this invention include those salts conventionally used in solid state electrochemical cells, such as lithium, sodium, potassium or ammonium salts. Preferred examples are sodium and lithium salts of less mobile anions of weak bases having a large anionic radius. Examples may be selected from the group consisting of $I^-$, $Br^-$, $SCN^-$, $ClO_4^-$, $BF_4^{P-}$, $F_6^-$, $AsF_6^-$, $CF_3COO^-$, $CF_3SO_3^-$, and the like. Representative specific examples of such salts include $LiClO_4$, $NaClO_4$, $LiF_3CSO_3$, $LiBF_4$ and the like.

The salt may be used up to an amount which does not exceed its solubility limit in the electrolyte. The amount will therefore vary with the nature of the liquid solvent. As a general rule, the maximum amount of salt within its solubility limit should be used to maximize the ionic conductivity of the electrolyte. In most applications, about 10 to 60 parts salt is used per 100 parts of liquid phase.

Intercalation compounds and electronically conductive materials useful in forming the cathode that is used with the anode of the present invention are well known in the art and include metal oxides, sulfides and selenides. Representative examples of intercalation compounds are $V_3O_8$, $V_6O_{13}$, $V_2O_5$, $MnO_2$, $MoO_2$, $MoS_3$, $Cr_3O_6$, $LiCoO_2$, $Li_xV_3O_8$, $TiS_2$ and the like. Preferably, the intercalation compound is a vanadium oxide containing lithium or $LiCoO_2$. The intercalation compound preferably has a particle size of less than about 1 micron but can range up to about 20 microns. Other examples can be found in the aforementioned references, such as U.S. Pat. Nos. 4,925,752 and 4,822,701.

The conductive filler in the cathode is usually carbon black. Certain conductive polymers (which are characterized by a conjugated network of double bonds) like polypyrol and polyacetylene may also be used for this purpose.

To prepare an anode in accordance with the present invention, a mixture of the uncross-linked polymer or the unpolymerized monomer or oligomer and the initiator or cross-linking agent where needed is prepared and blended with the ionically conducting liquid, the ionizable salt, and the amorphous carbon. Blending is carried out, e.g., by agitation, for example, by stirring and the like, such that the particles of the amorphous carbon particles become individually and homogeneously dispersed in the mixture as described above. Preferably, this is done in an inert atmosphere at ambient temperatures of about 60° C. Due to the amorphous nature of the carbon, the viscosity of the resulting solution is higher than about 8,000 cp at 75° C, preferably higher than about 10,000 cp at 75° C.

The anode is prepared by coating the mixture on a current collector, such as a metal foil member, and curing the composition. A typical foil is lithium foil or lithium coated on nickel or copper foil or the like. The composition can be coated by solvent coating using conventional coating techniques such as a doctor blade or an extrusion method can be used. The anode is coated in a thickness of about 10 to 100 microns and typically 30 to 60 microns.

Where a solvent casting technique is used, in addition to the components discussed above, the anode composition will contain a volatile solvent such as tetrahydrofuran. After coating, the solvent is removed if a solvent casting method is used, and the composition is cured.

Anode compositions in accordance with the present invention contain about 10 to 50 parts by weight of the amorphous carbon and preferably from about 25 to about 35 parts, about 0 to 10 parts of a conductive filler, about 0 to 20 parts of an ionizable metal salt, about 45 to 80 parts of an ionically conducting liquid, and about 20 to 55 parts of the cross-linked polymer, preferably 25 to 40 parts, per 100 parts of the final polymer electrolyte composition (all parts by weight).

In one embodiment of the present invention, an amorphous carbon/polymer composite anode prepared by the aforementioned method is coated with a polymer host network electrolyte as previously described. The resulting composite electrode is cured by electron beam radiation. A polymer composite cathode is formed by coating a $V_6O_{13}$/carbon/polymer composite onto a nickel substrate and curing with electron beam radiation. The cured composite cathode is lithiated by electrochemical means and laminated onto the anode/electrolyte composite surface. The resulting electrochemical cell has an open circuit voltage of about 3 volts and can be cycled between that voltage and 0 volts repeatedly.

Another embodiment of the present invention utilizes the amorphous carbon/polymer composite electrode as both the anode and the cathode. The electrodes are prepared as described above and laminated with a polymer host network electrolyte therebetween. Prior to lamination, the electrode to be utilized as the anode is lithiated by electrochemical means. The resulting electrochemical cell has an open circuit voltage of about 1.5 volts and can be cycled between that voltage and 0 volts repeatedly.

EXAMPLE

Acetylene black (Chevron 100% compress) was dried in vacuum at 100° C. for 48 hrs., to a level of water content smaller than 100 ppm. Sixty-two grams of propylene carbonate (PC) of high purity, containing less than 50 ppm of water, was put in a double planetary mixer under inert atmosphere. To this PC, 1.5 g of high molecular weight (MW=900,000) polyethylene oxide (PEO) containing less than 50 ppm of water was added. The mixer content was then heated to 60° C. under an inert atmosphere and stirred at 60 rpm. The PC/PEO mix was stirred for about 0.5 hrs. or until the PEO was completely dissolved. Then 14 g of polyethylene glycol diacrylate (PEGDA), having a MW of 400-600 and a water content less than 50 ppm, and 2.5 g of trimethylolpropane ethoxylate triacrylate (TMPEOTA) of high MW and of water content less than 50 ppm was added and stirred until the mixture was homogenous. To this homogenous mixture, 20 g of the predried carbon material was added. This composite anode precursor mix was stirred for 2 hrs. at 60° C. under inert atmosphere so that the amorphous carbon particles became individually and homogeneously dispersed. Due to the nature of the carbon material, the viscosity of the composite anode precursor was higher than 10,000 cp at 75° C. The apparent density of the composite anode precursor was approximately 1.2 g/cm$^2$. Approximately 100 mg of this composite anode precursor was coated as a thin (75-85 μm) uniform layer on a 10 cm$^2$ surface treated nickel current collector of 25 μm thickness. This anode precursor laminate was then either cured through exposure to an electron beam (1-9 Mrad) or overcoated with the polymer electrolyte precursor, then cured by the same means.

A lithiated composite $Li_8V_6O_{13}$ based cathode (1.5 mAh/cm$_2$) was mounted in front of the carbon based composite anode. The cell was discharged at current density of 100 μA/cm$^2$. Approximately 1.4 mAh/cm$^2$ capacity was observed during the first charge of the carbon based composite anode. Subsequent to this first charge of the carbon composite anode, the anode was discharged at the same current density, and approximately 50-60% of the charge capacity was available. Further cycling showed capacity decrease similar to what was observed in Li/$V_6O_{13}$ cells.

All publications, patents and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A carbon/polymer composite electrode comprising carbon entrapped in a polymeric matrix, wherein said carbon is selected from the group consisting of microcrystalline carbon wherein at least about 80% of the carbon microcrystals are in random arrangement and substantially amorphous carbon wherein at least 80% of the carbon is non-crystalline and said matrix further entraps an interpenetrating ionically conducting liquid having an alkali metal or ammonium salt dissolved therein.

2. The electrode of claim 1 wherein said carbon is substantially amorphous carbon.

3. The electrode of claim 2 wherein said ionically conducting liquid is a low volatility aprotic solvent.

4. The electrode of claim 3 wherein said polymer is a conductive polymer

5. The electrode of claim 1 wherein said polymer is formed at least in part from polyethylene oxide monomers.

6. The electrode of claim 5 wherein said ionically conducting liquid is selected from the group consisting of propylene carbonate, gamma-butyrolactone, 1,3-dioxolane, and 2-methyltetrahydrofuran.

7. The electrode according to claim 2 wherein the substantially amorphous carbon has a surface area greater than about 20 $m^2/g$.

8. The electrode according to claim 7 wherein the substantially amorphous carbon has a surface area greater than about 50 $m^2/g$.

9. The electrode according to claim 2 wherein the substantially amorphous carbon has a particle size diameter of less than about 5 $\mu m$.

10. An electrochemical cell comprising an anode, a cathode, and a polymeric electrolyte wherein said anode comprises carbon entrapped in a polymeric matrix, wherein said carbon is selected from the group consisting of microcrystalline carbon wherein at least about 80% of the carbon microcrystals are in random arrangement and substantially amorphous carbon wherein at least 80% of the carbon is non-crystalline and said matrix further entraps an interpenetrating ionically conducting liquid having an alkali metal or ammonium salt salt dissolved therein.

11. The electrochemical cell of claim 10 wherein said cathode is a vanadium oxide composition containing intercalated lithium ions or $LiCoO_2$.

12. The electrochemical cell of claim 11 wherein said carbon is substantially amorphous carbon.

13. The electrochemical cell of claim 12 wherein said anode contains intercalated lithium ions.

14. The electrochemical cell of claim 13 wherein said ionically conducting liquid is a low volatility aprotic solvent.

15. The electrochemical cell of claim 14 wherein said polymer is a conductive polymer.

16. The electrochemical cell of claim 15 wherein said ionically conducting liquid is selected from the group consisting of propylene carbonate, gamma-butyrolactone, 1,3-dioxolane, and 2-methyltetrahydrofuran.

17. The electrochemical cell of claim 10 wherein said polymer is formed at least in part from polyethylene oxide monomers.

18. The electrochemical cell according to claim 12 wherein the substantially amorphous carbon has a surface area greater than about 20 $m^2/g$.

19. The electrochemical cell according to claim 18 wherein the substantially amorphous carbon has a surface area greater than about 50 $m^2/g$.

20. The electrochemical cell according to claim 12 wherein the substantially amorphous carbon has a particle size diameter of less than about 5 $\mu m$.

21. The electrode according to claim 2 wherein said substantially amorphous carbon is selected from the group consisting of acetylene black and Shawinigan Black.

22. The electrode according to claim 12 wherein said substantially amorphous carbon is selected from the group consisting of acetylene black and Shawinigan Black.

* * * * *